United States Patent
Almuhaisin

(10) Patent No.: US 11,968,204 B2
(45) Date of Patent: Apr. 23, 2024

(54) GENERIC MIDDLEWARE SYSTEM

(71) Applicant: SAUDI ARABIAN OIL COMPANY, Dhahran (SA)

(72) Inventor: Abdulaziz Saud Almuhaisin, Dhahran (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 266 days.

(21) Appl. No.: 17/651,515

(22) Filed: Feb. 17, 2022

(65) Prior Publication Data

US 2023/0262047 A1    Aug. 17, 2023

(51) Int. Cl.
*H04L 9/40*    (2022.01)
*H04L 67/02*    (2022.01)

(52) U.S. Cl.
CPC ........ *H04L 63/083* (2013.01); *H04L 63/0435* (2013.01); *H04L 63/102* (2013.01); *H04L 67/02* (2013.01)

(58) Field of Classification Search
CPC . H04L 63/083; H04L 63/0435; H04L 63/102; H04L 67/02
See application file for complete search history.

(56) References Cited

U.S. PATENT DOCUMENTS

| | | | |
|---|---|---|---|
| 7,627,853 B2 | 12/2009 | Ibert et al. | |
| 9,229,998 B2 | 1/2016 | Iyer et al. | |
| 10,079,874 B2 | 9/2018 | Jung et al. | |
| 2003/0195997 A1* | 10/2003 | Ibert | G06F 9/542 719/318 |
| 2006/0047780 A1* | 3/2006 | Patnude | H04L 67/01 709/219 |
| 2012/0124202 A1* | 5/2012 | Cooper | H04L 67/561 709/224 |
| 2016/0132309 A1* | 5/2016 | Rajasekhar | H04L 67/51 717/102 |

* cited by examiner

*Primary Examiner* — Shanto Abedin
(74) *Attorney, Agent, or Firm* — Osha Bergman Watanabe & Burton LLP

(57) ABSTRACT

A middleware, for providing an interconnection between heterogeneous applications, receives a first HTTP POST request that includes a header and a body. Then, the middleware creates a HTTP GET request using the header. The middleware establishes a secure connection with an authorization server, and submits the HTTP GET request to the authorization server asynchronously. The middleware receives a response to the HTTP GET request regarding a validation of identifiers in a query string of the HTTP GET request, and decrypts a username and a password using the identifiers in response to the identifiers located in the authorization server. The middleware serializes an output of the decrypted username and the decrypted password in a Java Script Object Notation (JSON) format, and places the output in a body of a second HTTP POST request. The middleware responds the second HTTP POST request to a data server.

20 Claims, 5 Drawing Sheets

GENERIC MIDDLEWARE SYSTEM

BACKGROUND

A middleware is an application used to map and pipe outputs and inputs of different heterogeneous applications to stick them together to enable them to share data back and forth. A client side web application often reads and stores data in a server of backend Enterprise Resource Planning (ERP) system using a middleware.

However, the current practice for building middleware is specific to each client application such that the middleware needs to be updated each time when an interface in a client side or a server side is changed. In addition, the middleware tends to be complex, and needs frequent maintenance.

Accordingly, there exists a need for a generic middleware that can work with any web application to any data server without the need of updating the middleware in case of an interface change, and that can be easily maintained without a frequent maintenance.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a middleware for providing an interconnection between heterogeneous applications.

In one or more embodiments, a middleware receives a Hypertext Transfer Protocol (HTTP) POST request from an application, where a first HTTP POST request includes a header and a body. A HTTP GET request is created using the header of the first HTTP POST request. A secure connection with an authorization server is established, and the HTTP GET request is submitted to the authorization server asynchronously. A response to the HTTP GET request regarding a validation of identifiers in a query string of the HTTP GET request is received. In response to the identifiers being determined valid in the authorization server, a username and a password are decrypted using the identifiers. An output of the decrypted username and password is serialized in a Java Script Object Notation (JSON) format, and the output is placed in a body of a second HTTP POST request. The second HTTP post request is responded to a data server.

In one or more embodiments, a middleware responds with an error in response to the identifiers being determined not valid in the authorization server. The second HTTP POST request connection to data server is established using the decrypted username and password. The second HTTP POST request is sent to the data server asynchronously.

In one or more embodiments, the header of the first HTTP POST request includes a plurality of fields comprising a username identifier, a password identifier, a target system HTTP handler Uniform Resource Locators (URL) identifier, and an operation code. The middleware responds the second HTTP POST request to the data server identified by the target system HTTP handler URL identifier. The middleware establishes an asynchronous connection to the data server and waits for a response from the data server.

In another aspect, embodiments disclosed herein related to a system for providing an interconnection between heterogeneous applications.

In one or more embodiments, a system includes a client, a web application server, an enterprise resource planning (ERP) system, and a network. The client includes a web application that creates a first Hypertext Transfer Protocol (HTTP) POST request including a header and a body. The web application server includes a web server and a middleware. The middleware receives the first HTTP POST request from the web application. Then, the middleware creates a HTTP GET request using the header. The middleware establishes a secure connection with an authorization server, and submits the HTTP GET request to the authorization server asynchronously. The middleware receives a response to the HTTP GET request regarding a validation of identifiers in a query string of the HTTP GET request, and decrypts a username and a password using the identifiers in response to the identifiers located in the authorization server. The middleware serializes an output of the decrypted username and password in a Java Script Object Notation (JSON) format, and places the output in a body of a second HTTP POST request. The middleware responds the second HTTP POST request to a data server. The ERP system includes the authorization server and the data server.

Other aspects and advantages of the claimed subject matter will be apparent from the following description and the appended claims.

BRIEF DESCRIPTION OF DRAWINGS

The advantages and features of the present invention will become better understood with reference to the following more detailed description taken in conjunction with the accompanying drawings in which.

DETAILED DESCRIPTION

Figure 1:
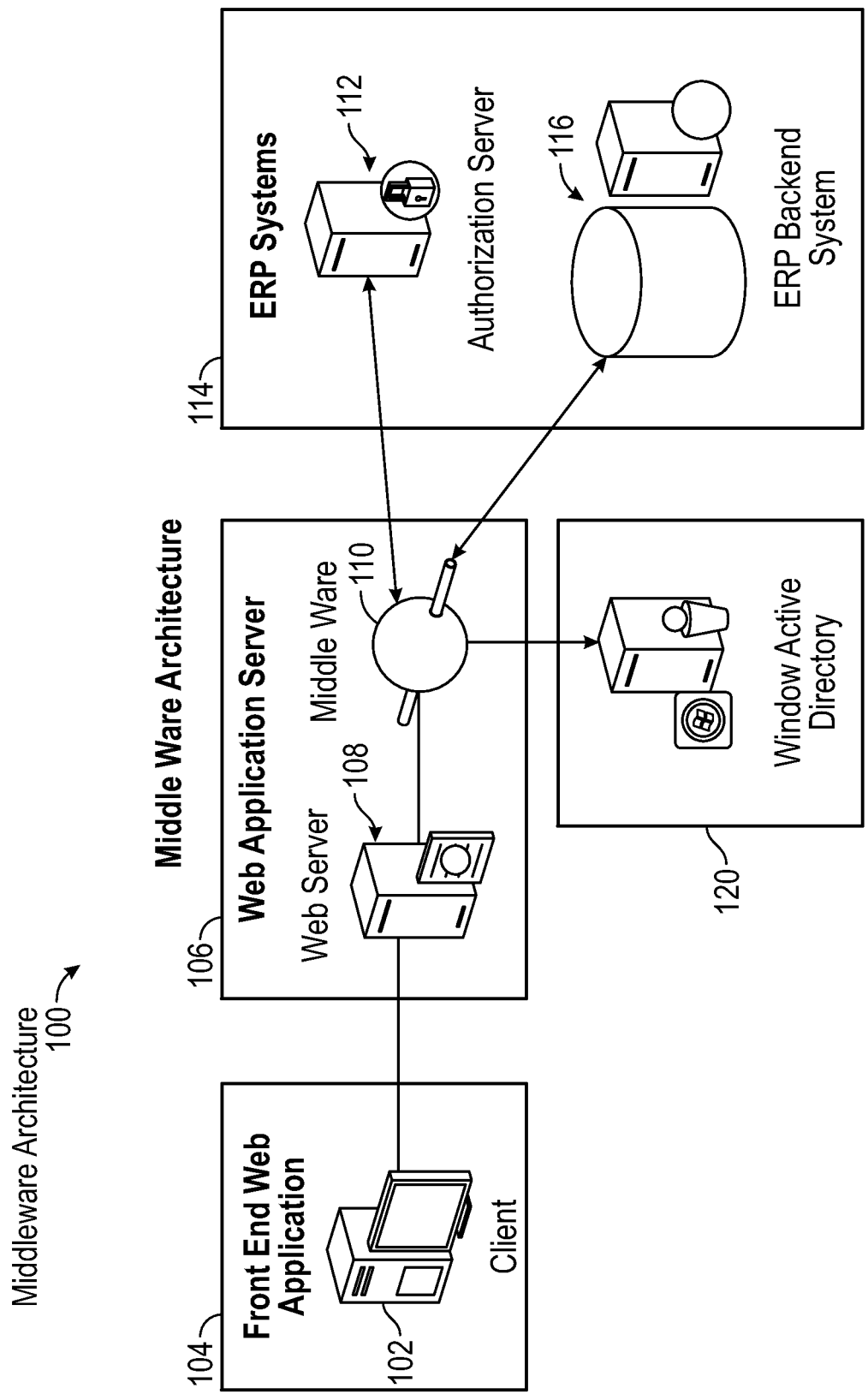
FIG. 1 illustrates a middleware architecture in a system in accordance with one or more embodiments of the disclosure.

Embodiments disclosed herein relate to a generic, scalable integration and information exchange process between Enterprise Resource Planning (ERP) and web applications using HTTP protocol. More specifically, embodiments disclosed herein build a generic, scalable middleware process to dynamically exchange information and for integration between an ERP backend system and any web application with authorization and authentication design.

A middleware is an application used to map and pipe outputs and inputs of different heterogeneous applications to enable them to share data back and forth. Examples of middleware include database middleware, application server middleware, message-oriented middleware, and web middleware. In a specific sense, a middleware can be described as the dash ("-") in client-server, or the -to- in peer-to-peer. Services that can be regarded as a middleware include enterprise application integration, data integration, message-oriented middleware (MOM), object request brokers (ORBs), and the enterprise service bus (ESB).

A web application often needs to read and store data in a backend ERP system. However, this comes with its own challenges. ERP provides open data (OData) interfaces that allows creation and consumption of representational state transfer (REST) application programming interface (API) to map backend objects to front end objects of the web application, but this comes with limitations and some complexities especially when using batch system users. The mapping of a username in the ERP system to the batch system is sometimes a challenge. For example, a username needs to have access to an ERP system with certain authorizations to execute required codes. However, most times, users should not have access nor authorization, thus, the codes should be executed by a batch user for cyber-security reasons. Therefore, only a mapping between a user who access a web application from a browser and a back-end EPR system without having unnecessary access to the ERP system is needed.

In one aspect, embodiments disclosed herein relate to a generic middleware in an ERP system. To able to build a generic middleware, a protocol or a communication standard need to be established. The protocol will be divided into three main parts. The first is agreeing on what the web application will send to the middleware. The second part is how the middleware will handle the request coming from a web application, how to authenticate the application user, and how to fetch or post data to the ERP backend system. The final part is how to handle requests coming from the middleware, the design of the http handler in the backend ERP system, and an importing parameter that accepts the username in each function that will be used to handle a client request.

Embodiments of the present disclosure may provide at least one of the following advantages. Embodiments disclosed herein enable the use of a middleware that does not need to be updated whenever a new field is needed, or a field is changed. Secondly, embodiments disclosed herein enable mapping the username of the logged in user in an active directory to an ERP system username. Embodiments disclosed herein establish a protocol of communication between any web application to any ERP business system. Using a generic scalable middleware that may be used with any web application and any ERP system allows for easy maintenance of the middleware.

FIG. 1 illustrates a middleware architecture 100 in a system. Middleware architecture 100 includes a client 102, a web application server 106, ERP systems 114, and a Windows active directory 120. Client 102 includes a front end web application 104. Web application server 106 includes a web server 108 and a middleware 110. ERP systems includes an authorization server 112 and an ERP Backend system 116.

In middleware architecture system 100, a user interacts with front end web application 104 at client 102 to access ERP systems 114. Front end web application 104 send a request for an access to ERP backend system 116 to web server 108. In response to receiving the request from front end web application 104, middleware 110 validates the address of ERP system 114 in the request via Windows active directory 120, and a username and a password in the request via authorization server 112. Then, middleware 110 sends the request to ERP backend system 116.

In this system, middleware 110 is dedicated to accessing ERP systems 114. That is, if a user wants to access a new ERP system or an interface to ERP systems 114 is changed, middleware 110 will not be able to access the new or changed ERP systems.

Figure 2:
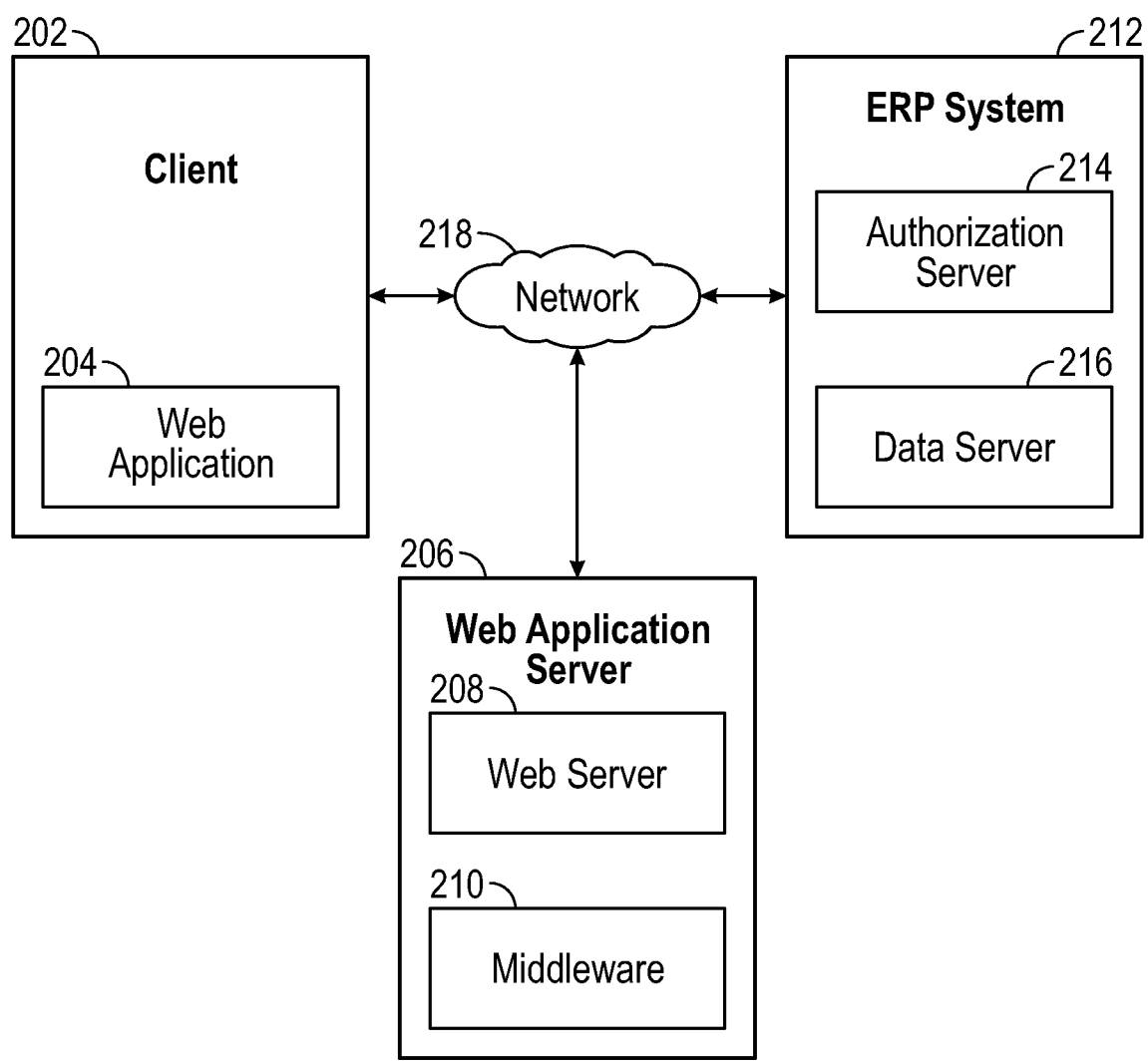
FIG. 2 illustrates an exemplary system architecture, in accordance with one or more embodiments of the disclosure.

FIG. 2 illustrates an exemplary system architecture 200 for providing interconnection between heterogeneous applications. System architecture 200 includes a client 202, a web application server 206, an ERP system 212, and a network 218. Client 202 includes a web application 204 running on client 202. Web application server 206 includes a webserver 208 and a middleware 210 running on web application server 206. ERP system 212 includes an authorization server 214 and a data server 216.

In one or more embodiments, client 202 may be a workstation computer, a desktop computer, a laptop, a tablet, or a smart phone. In one or more embodiments, web application 204 may perform creating a Hypertext Transfer Protocol (HTTP) POST request and sending the HTTP POST request to ERP system 212 to send data via web application server 206 via network 218. For example, when a user of web application 204 at client 202 sends data to ERP system 212, the web application 204 creates a HTTP POST request and send it to web application server 206 via network 218. Then, web application server 206 sends the POST request to ERP system 212 via network 218. The HTTP POST request may include headers comprising a username identifier, a password identifier, a target ERP system http/https handler Uniform Resource Locators (URL), and an operation code or a function module name in the target ERP system.

In embodiments disclosed herein, a "user" may be represented as a single individual. However, other implementations of the disclosure encompass a "user" being an entity controlled by a set of users and/or an automated source.

In one or more embodiments, web application server 206 may be a local server or a cloud. Web server 208 may be a software running on web application server 206 or a separate server. Web server 208 is configured to read user input, verify the input, call data server 216, and then transmit an output to web application 204 running on client 202.

In one or more embodiments, middleware 210 maybe a software running on web application server 206. Middleware 210 performs interpreting a POST request from web application 204 and sending another POST request with translated code or module name to ERP system 212 via network 218. First entry point of middleware 210 is a POST request handler accepting a JavaScript Object Notation (JSON) object from a body of the POST request. Then, middleware 210 calls authorization server 214 to get a username and a password of ERP system 212 that will be used to access data server 216 specified in the target ERP system http/https handler URL.

For example, upon receiving a POST request from web application 204, middleware 210 creates a HTTP GET request with information from the POST request. The information from the POST request may be identifiers in a header of the POST request. Middleware 210 sends the HTTP GET request to authorization server 214 via network 218 to get a username and a password for ERP system 212. After getting the username and the password, middleware 210 creates another HTTP POST request with information from the previous HTTP POST request from web application 204 that are appropriate to data server 216 in JSON format, and send the HTTP POST request to data server 216. In one or more embodiments a HTTP POST request sent by middleware 210 may include headers comprising logged on user from web server 208 using the "http context" (X-INITIATOR) and an operation code, which is from a HTTP POST request from web application 204.

In one or more embodiments, ERP system 212 may be a local server or a cloud. In one or more embodiments, authorization server 214 may be a software running on ERP system 212 or a separate server. In one or more embodiments, data server 216 may be a software running on ERP system 212 or a separate server. Authorization server 214 validates information such as username and password identifiers in a header of a HTTP POST request from web application 204. Data server 216 may include an application different from web application 204 (not depicted).

In one or more embodiments, data server 216 may include an HTTP interface mapped to a handler, which maps a POST request to a REST API handler class. A REST API is an interface that conforms to the set of architectural style that defines a set of rules in order to create web services. In a REST architecture, an object of data requested by a client is created, and values of the object is sent in response to the user. The REST API hander class processes POST messages by calling its run method. Since these run calls always occur in the order of the POST messages received on the same thread, it allows for serialization of events. The REST API handler class includes a POST request handler method that reads headers in a HTTP POST request from middleware 210. Then, the method calls a generic handler method that accepts JSON object from the HTTP POST request.

In one or more embodiments (not depicted), the generic handler method may be implemented using a dynamic programming concept. The dynamic programming concept may be structured to have: (1) six dynamic pointer variables for a table variable, importing parameters, exporting parameters, a work area, a temporary variable to importing parameters, and a temporary variable to exporting parameters; (2) an interface of a method or a function that will provide the required data or do the required operation based on an operation code in a HTTP POST request; (3) an interface structure of function to separate importing parameters into one table or array and exporting parameters to another table or an array; (4) dynamic pointer to an importing variable to a reference of data of same types as the importing parameters structure; (5) dynamic pointer to an exporting variable to a reference of data of same types as the exporting parameters structure; (6) de-serializing a JSON object from the HTTP POST request, and updating importing dynamic pointer target memory location to hold the de-serialized JSON object output; (7) dynamically inserting a username in the HTTP POST request into the importing parameters; (8) calling a function; and (9) serializing an output from the dynamic exporting variable to JSON format and return the output to the client via middleware 210.

As discussed above, to send data to data server 216, web application 204 sends a POST request to an API of data server 216 with a JavaScript Object Notation (JSON) in the POST request body. An API is a software intermediary that allows two applications to talk to each other. For example, an application A reads data from and write data to another application B via an API provided by the application B. A POST request is a way for the web application to send data to a destination via a network and is a part of Hypertext Transfer Protocol (HTTP) request method. Typically, a POST request is sent via a Hypertext Markup Language (HTML). However, when the POST request is sent via a method other than an HTML form, the body of the POST request can take any type such as a JSON object.

Figure 3:
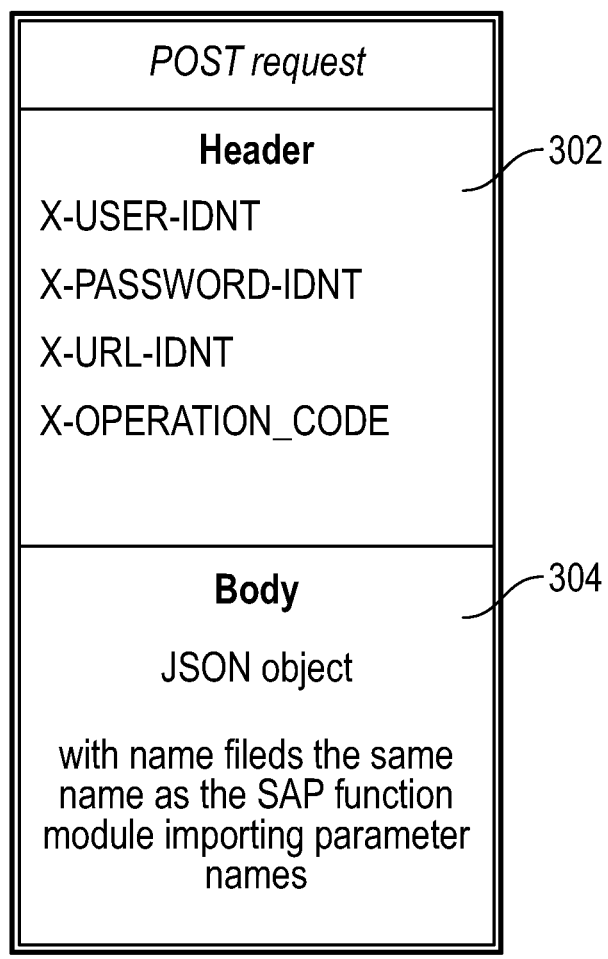
FIG. 3 illustrates an exemplary POST request by a web application, in accordance with one or more embodiments of the disclosure.

FIG. 3 illustrates an exemplary POST request by a web application. In one or more embodiments, POST request 300 comprises a header 302 comprising a plurality of fields including a username identifier (X-USER-IDNT), a password identifier (X-PASSWORD-IDNT), a target system HTTP Uniform Resource Locators (URL) identifier (X-URL-IDNT), and an operation code (X-OPERATION_CODE). The operation code may be a function module name in the target system. Values of these fields are identifiers and not the actual information. For example, an identifier of a password is sent via a value in the password identifier, but not the actual password. As such, the username identifier identifies a username. The password identifier identifies a password. The target system HTTP URL identifier identifies an address of a target system. The operation code identifies a code or a function module name to run on a target system.

POST request 300 further comprises a body 304. Body 304 may include a JSON object. A JSON is a data-interchange format in a human readable form based on a subset of the JavaScript programming language. A JSON is built on two structures: a collection of name/value pairs and an ordered list of values. In one or more embodiments, JSON object in body 304 may include name fields with the same name of data and function module input parameter names to allow mapping of the JSON object and function module input parameters. Referring back to FIG. 2, these names are APIs of data server 216 that web application 204 utilize to communicate with applications in data server 216, and to send data to data server 216.

Figure 4:
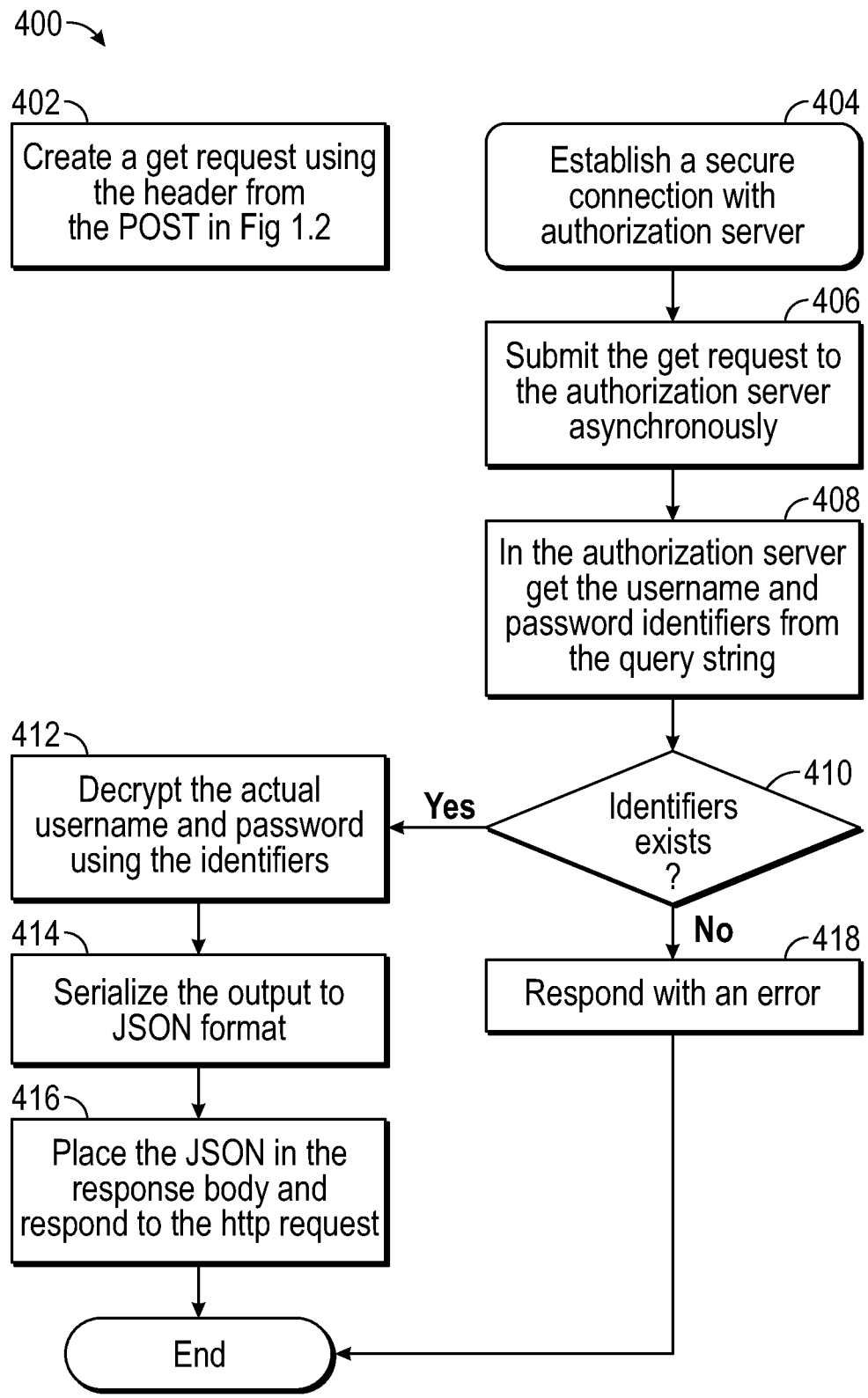
FIG. 4 is a flowchart of a method of providing interconnection of heterogeneous applications by a middleware, in accordance with one or more embodiments of the disclosure.

FIG. 4 is a flowchart of a method 400 for providing interconnection of heterogeneous applications. Method 400 may be performed by processing logic that includes hardware (e.g., circuitry, dedicated logic, programmable logic, microcode, etc.), software (e.g., instructions run on a processing device to perform hardware simulation), or a combination thereof. In one implementation method 400 may be performed by middleware 210 as described with respect to FIG. 2. Method 400 may provide interconnection of web application 204 and data server 216. In describing the method 400, reference is made to FIGS. 2 and 3 to illustrate an implementation. It is noted that the example provided in FIGS. 2 and 3 is meant for illustrative purposes, and is not to be considered a limiting implementation.

At block 402, a HTTP GET request is created with a header from a first HTTP POST request received, which includes identifiers. In FIGS. 2 and 3, web application 204 creates POST request 300 with header 304 and sends POST request 300 to web application server 206 via Network 218. Upon receiving the POST request 300, middleware 210 running on web application server 206 creates a HTTP GET request with Header 304 from POST request 300. Header 304 includes a plurality of a field that are identifiers to a username, a password, an URL, and an operation code.

Referring back to FIG. 4, at block 404, a secure connection with an authorization server is established. In FIG. 2, middleware 210 establishes a secure connection with authorization server 214 via network 218. For example, in one or more embodiments, middleware 210 may establish a secure connection using hypertext transfer protocol secure (HTTPS) and encrypted login information.

At block 406, the HTTP GET request is submitted to the authorization server asynchronously. In FIG. 2, middleware 210 a synchronously submits the created HTTP GET request to authorization server 214 via network 218.

Next, at block 408, a response to the HTTP GET request regarding a validation of the identifiers in a query string of the HTTP GET request is received. In FIG. 2, middleware 210 receives a response to the HTTP GET request from Authorization server 214 regarding a validation of the identifiers in a query string of the HTTP GET request via network 218.

At decision block 410, in response to receiving the response, a validation of the identifiers is determined. That is, whether the identifiers exist in the authorization server is determined based on the response received. In FIGS. 2 and 3, upon receiving the response to the HTTP GET request, middleware 210 determines whether the identifiers in header 304 exist in authorization server 214 based on the response to the HTTP GET request.

In response to the identifiers being determined valid, method 400 moves to block 412. At block 412, the actual username and password are decrypted using the identifiers. In FIGS. 2 and 3, if the identifiers in header 304 are determined to be valid, middleware 210 decrypts the actual username with X-USER-IDNT identifier and the actual password with X-PASSWORD-IDNT identifier in header 304.

Referring back to FIG. 4, at block 414, an output of the decrypted username and the decrypted password is serialized to a JSON format. In FIGS. 2 and 3, middleware 210 serialize an output of the decrypted username and the decrypted password to JSON format.

At block 416, the output in JSON format is placed in a body of a second HTTP POST request and respond the second HTTP POST request to a target system. In FIGS. 2 and 3, the output in JSON format is placed in a body of a second HTTP POST request created by middleware 210. Then, middleware 210 respond the second POST request to data server 216.

In one or more embodiments, the first HTTP POST request to data server 216 is sent asynchronously. In one or more embodiments, middleware 210 may establish the second HTTP POST request connection to data server 216 using the decrypted username and the decrypted password. In one or more embodiments, the second POST request may include a header comprising a logged-on user using the "http context," in which logged on user information is used to communicate to data server 216 using a batch user to fetch the logged on user specific information, from web server 208 and the operation code from header 302. In one or more embodiments, middleware 210 may establish an asynchronous connection to data server 216, and wait for a response from data server 216.

If identifiers are determined to be not valid at decision block 410, method 400 moves to block 418. At block 418, the HTTP POST request is responded with an error. In FIG. 2, if the identifiers in header 304 are determined to be not valid, middleware 210 responds the HTTP POST request back to web application 204 with an error.

Figure 5:
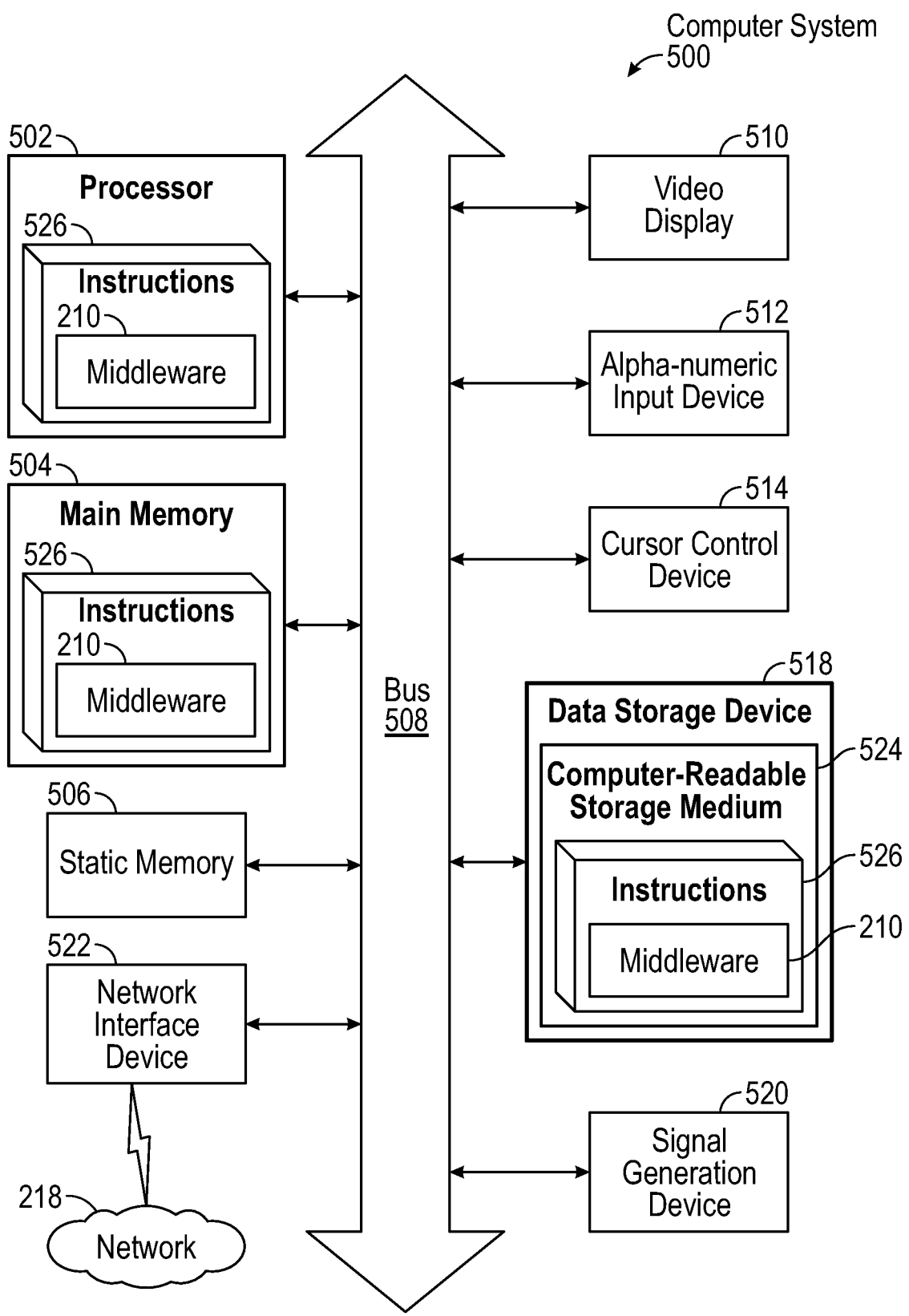
FIG. 5 illustrates a block diagram of an exemplary computer device operating, in accordance with one or more embodiments of the disclosure.

FIG. 5 illustrates a block diagram of an illustrative computing device operating, in accordance with the examples of the disclosure. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 500 includes a processing device 502, a main memory 504 (e.g., read-only memory (ROM), flash memory, dynamic random access memory (DRAM) (such as synchronous DRAM (SDRAM) or RDRAM, etc.), a static memory 506 (e.g., flash memory, static random access memory (SRAM), etc.), and a data storage device 518, which communicate with each other via a bus 508.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the instructions 526 for performing the operations and steps discussed herein.

In accordance with one or more aspects of the present disclosure, processing device 502 may be configured to execute middleware 210 implementing methods 400 for providing interconnection between heterogeneous applications.

The computer system 500 may further include a network interface device 522 communicably coupled to network 218. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 518 may include a non-transitory computer-readable storage medium 524 on which is stored instructions 526 embodying any one or more of the methodologies of functions described herein. The instructions 526 may also reside, completely or at least partially, within the main memory 504 as instructions 526 and/or within the processing device 502 as instructions 526 during execution thereof by the computer system 500; the main memory 504 and the processing device 502 also constituting machine-accessible storage media.

In accordance with one or more aspects of the present disclosure, instructions 526 may comprise executable instructions encoding various functions of implementing methods 400 for providing interconnection between heterogeneous applications.

The non-transitory computer-readable storage medium 524 may also be used to store instructions 526 to implement any one or more of the methodologies of functions described herein in a computer system, such as the system described with respect to FIG. 2, and/or a software library containing methods that call the above applications.

While the non-transitory computer-readable storage medium 524 is shown in an example implementation to be a single medium, the term "non-transitory computer-readable storage medium" should be taken to include a single medium or multiple media (e.g., a centralized or distributed database, and/or associated caches and servers) that store the one or more sets of instructions. The term "non-transitory computer-readable storage medium" shall also be taken to include any medium that is capable of storing, encoding or carrying a set of instruction for execution by the machine and that cause the machine to perform any one or more of the methodologies of the disclosure. The term "non-transitory computer-readable storage medium" shall accordingly be taken to include, but not be limited to, solid-state memories, and optical and magnetic media.

In the foregoing description, numerous details are set forth. It may be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "initiating", "generating", "determining", "sending", "invoking", "storing", "updating", "identifying", "presenting", "causing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a machine-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems may appear as set forth in the description below. In addition, the disclosure is not described with reference to any particular programming language. It may be appreciated that a variety of programming languages may be used to implement the teachings of the disclosure as described herein.

The disclosure may be provided as a computer program product, or software, that may include a machine-readable storage medium having stored thereon instructions, which may be used to program a computer system (or other electronic devices) to perform a process according to the disclosure. A machine-readable storage medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

For purposes of this disclosure, any element mentioned in the singular also includes the plural.

Although some figures depict lines with arrows to represent intra-network or inter-network communication, in other implementations, additional arrows may be included to represent communication. Therefore, the arrows depicted by the figures do not limit the disclosure to one-directional or bi-directional communication.

Whereas many alterations and modifications of the disclosure may no doubt become apparent to a person of ordinary skill in the art after having read the foregoing description, it is to be understood that any particular example shown and described by way of illustration is in no way intended to be considered limiting. Therefore, references to details of various examples are not intended to limit the scope of the claims, which in themselves recite only those features regarded as the disclosure.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A method for providing an interconnection between heterogeneous applications, the method performed by middleware and comprising:
receiving a first Hypertext Transfer Protocol (HTTP) POST request from an application including a header and a body;
creating a HTTP GET request using the header;
establishing a secure connection with an enterprise resource planning (ERP) system comprising an authorization server;
submitting the HTTP GET request to the authorization server asynchronously;

receiving a response to the HTTP GET request regarding a validation of identifiers in a query string of the HTTP GET request;
decrypting a username and a password using the identifiers in response to the identifiers being determined valid in the authorization server;
serializing an output of the decrypted username and the decrypted password in a Java Script Object Notation (JSON) format;
placing the output in a body of a second HTTP POST request; and
responding the second HTTP POST request to a data server.

2. The method according to claim 1, wherein the second HTTP POST request to the data server is sent asynchronously.

3. The method according to claim 1, further comprising responding with an error in response to the identifier being determined not valid in the authorization server.

4. The method according to claim 1, further comprising establishing the second HTTP POST request connection to the data server using the decrypted username and password.

5. The method according to claim 1, wherein the header comprises a plurality of fields comprising a username identifier, a password identifier, a target system HTTP handler Uniform Resource Locators (URL) identifier, and an operation code.

6. The method according to claim 5, further comprising responding the second HTTP POST request to the data server identified by the target system HTTP handler URL identifier.

7. The method according to claim 1, further comprising establishing an asynchronous connection to the data server and waits for a response from the data server.

8. A system comprising:
a client computer comprising a web application configured to create a first Hypertext Transfer Protocol (HTTP) POST request including a header and a body;
a web application server comprising:
a web server; and
a middleware configured to:
receive the first HTTP POST request from the web application;
create a HTTP GET request using the header;
establish a secure connection with an authorization server;
submit the HTTP GET request to the authorization server asynchronously;
receive a response to the HTTP GET request regarding a validation of identifiers in a query string of the HTTP GET request;
decrypt a username and a password using the identifiers in response to the identifiers being determined valid in the authorization server;
serialize an output of the decrypted username and the decrypted password in a Java Script Object Notation (JSON) format;
place the output in a body of a second HTTP POST request; and
respond the second HTTP POST request to a data server;
an enterprise resource planning (ERP) system comprising the authorization server and the data server; and
a network.

9. The system according to claim 8, wherein the second HTTP POST request to the data server is sent asynchronously.

10. The system according to claim 8, wherein the middleware further configured to: respond with an error in response to the identifier being determined not valid in the authorization server.

11. The system according to claim 8, wherein the middleware further configured to: establish the second HTTP POST request connection to the data server using the decrypted username and password.

12. The system according to claim 8, wherein the header comprises a plurality of fields comprising a username identifier, a password identifier, a target system HTTP handler Uniform Resource Locators (URL) identifier, and an operation code.

13. The system according to claim 12, wherein the middleware further configured to respond the second HTTP POST request to the data server identified by the target system HTTP handler URL identifier.

14. The system according to claim 8, wherein the middleware further configured to establish an asynchronous connection to the data server and waits for a response from the data server.

15. A non-transitory computer-readable storage medium storing instructions that, when executed by a processing device, cause middleware of the processing device to:
receive a first Hypertext Transfer Protocol (HTTP) POST request from an application including a header and a body;
create a HTTP GET request using the header;
establish a secure connection with an enterprise resource planning (ERP) system comprising an authorization server;
submit the HTTP GET request to the authorization server asynchronously;
receive a response to the HTTP GET request regarding a validation of identifiers in a query string of the HTTP GET request;
decrypt a username and a password using the identifiers in response to the identifiers being determined valid in the authorization server;
serialize an output of the decrypted username and the decrypted password in a Java Script Object Notation (JSON) format;
place the output in a body of a second HTTP POST request; and
respond the second HTTP POST request to a data server.

16. The non-transitory computer-readable storage medium storing instructions according to claim 15, comprising further instructions that, when executed by the processing device, cause the processing device to respond with an error in response to the identifier being determined not valid in the authorization server.

17. The non-transitory computer-readable storage medium storing instructions according to claim 15, comprising further instructions that, when executed by the processing device, cause the processing device to establish the second HTTP POST request connection to the data server using the decrypted username and password.

18. The non-transitory computer-readable storage medium storing instructions according to claim 15, wherein the header comprises a plurality of fields comprising a username identifier, a password identifier, a target system HTTP handler Uniform Resource Locators (URL) identifier, and an operation code.

19. The non-transitory computer-readable storage medium storing instructions according to claim 18, comprising further instructions that, when executed by the processing device, cause the processing device to respond the second HTTP POST request to the data server identified by the target system HTTP handler URL identifier.

20. The non-transitory computer-readable storage medium storing instructions according to claim 15, comprising further instructions that, when executed by the processing device, cause the processing device to establish an asynchronous connection to the data server and waits for a response from the data server.

* * * * *